(12) United States Patent
Tanaka et al.

(10) Patent No.: US 7,700,686 B2
(45) Date of Patent: Apr. 20, 2010

(54) PROCESS FOR PRODUCING MODIFIED POLYMER, MODIFIED POLYMER OBTAINED BY THE PROCESS, AND RUBBER COMPOSITION THEREOF

(75) Inventors: Ryouji Tanaka, Chuo-ku (JP); Kouichirou Tani, Chuo-ku (JP); Takuo Sone, Chuo-ku (JP); Toshihiro Tadaki, Chuo-ku (JP)

(73) Assignee: JSR Corporation, Tokyo (JP)

( * ) Notice: Subject to any disclaimer, the term of this patent is extended or adjusted under 35 U.S.C. 154(b) by 144 days.

(21) Appl. No.: 11/908,502

(22) PCT Filed: Mar. 17, 2006

(86) PCT No.: PCT/JP2006/305347

§ 371 (c)(1),
(2), (4) Date: Oct. 5, 2007

(87) PCT Pub. No.: WO2006/101025

PCT Pub. Date: Sep. 28, 2006

(65) Prior Publication Data

US 2008/0188613 A1 Aug. 7, 2008

(30) Foreign Application Priority Data

Mar. 18, 2005 (JP) .............................. 2005-080723

(51) Int. Cl.
*C08C 19/44* (2006.01)
*C08L 55/00* (2006.01)
(52) U.S. Cl. ........................................ 524/572; 524/566
(58) Field of Classification Search .................. 524/572
See application file for complete search history.

(56) References Cited

U.S. PATENT DOCUMENTS

| 4,460,739 | A  | * | 7/1984 | Ashby ........................ 524/702 |
| 2005/0009979 | A1 | * | 1/2005 | Tanaka et al. ............... 524/492 |
| 2005/0070672 | A1 |   | 3/2005 | Ozawa et al. |

FOREIGN PATENT DOCUMENTS

| EP | 1 022 291 A1 | 7/2000 |
| EP | 1 449 857 A1 | 8/2004 |
| EP | 1 457 501 A1 | 9/2004 |
| JP | 51 140950 | 12/1976 |
| JP | 60 49077 | 3/1985 |
| JP | 62 43460 | 2/1987 |
| JP | 2005 008870 | 1/2005 |
| WO | 03 046020 | 6/2003 |

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

A process for producing a modified polymer which increases low heat buildup and reinforcing capability of a rubber composition and which has excellent abrasion resistance, mechanical characteristics, and processability; a modified polymer obtained by the process; and a rubber composition using the modified polymer are provided. The process comprises a step of carrying out a modification reaction on the active end of a conjugated diene polymer having a vinyl content of below 10%, a cis-1,4 bond content of 75% or higher, and an active end, using an alkoxysilane compound, and a step of carrying out a condensation reaction in the presence of a condensation accelerator comprising a compound of an element belonging to at least one of the groups 4A (excluding Ti), 2B, 3B, and 5B of the periodic table.

14 Claims, No Drawings

US 7,700,686 B2

PROCESS FOR PRODUCING MODIFIED POLYMER, MODIFIED POLYMER OBTAINED BY THE PROCESS, AND RUBBER COMPOSITION THEREOF

TECHNICAL FIELD

The present invention relates to a process for producing a modified polymer, a modified polymer obtained by the process, and a rubber composition thereof. More particularly, the present invention relates a process for producing a modified polymer having excellent low heat buildup (low-fuel consumption) and excellent reinforcing capability with a filler, a modified polymer obtained by such a process, and a rubber composition thereof.

BACKGROUND ART

In recent years, the demands for low-fuel consumption of automobiles are becoming severer in connection with social requests for energy conservation. In order to comply with such demands, as for tire performance, a further decrease in rolling resistance of tires has been desired. Techniques of optimizing tire structures have also been studied as techniques for decreasing the rolling resistance of tires. However, the most general technique employed is using a material having lower heat buildup as the rubber composition.

In order to obtain such a rubber composition having low heat buildup, there have heretofore been promoted many technical developments of modified rubbers for rubber compositions using silica or carbon black as a filler. Of these, a process of modifying polymerization active ends of conjugated diene polymers obtained by anionic polymerization using an organolithium compound with an alkoxysilane derivative having a functional group which interacts with the filler has particularly been proposed as an effective process.

However, many of these are applied to polymers in which the living properties of the polymer ends can be easily secured, and only a few are applied to improve the modification of cis-1,4-polybutadiene, which is particularly important in tire side wall rubber, tire tread rubber, and the like. Furthermore, the modifying effect in rubber compositions comprising silica or carbon black is not necessarily sufficient. In particular, the modifying effect of rubber in which carbon black has been incorporated is rarely achieved for cis-1,4-polybutadiene.

In order to overcome the above-mentioned deficiencies, a process in which an end-modified conjugated diene polymer is obtained by reacting an active end of a conjugated diene polymer having a high cis content obtained by using a rare earth catalyst with a functional group-containing alkoxysilane derivative which interacts with a filler, and a method of adding a condensation accelerator at the time of alkoxysilane modification (refer to Patent Documents 1 and 2) have been suggested. However, more advanced performance of resulting modified polymer is desired.

Patent Document 1: WO 03/046020 A1

Patent Document 2: JP-A-2005-8870

DISCLOSURE OF THE INVENTION

In consideration of the above-mentioned circumstances, an object of the present invention is to provide a process for producing a modified polymer which further enhances low heat buildup and reinforcing capability when used in a rubber composition and which has excellent abrasion resistance, mechanical characteristics, and processability; a modified polymer obtained by the process; and a rubber composition using the modified polymer.

According to the present invention, there is provided a process for producing a modified polymer which comprises a step of carrying out a modification reaction on an active end of a conjugated diene polymer having a vinyl content of below 10%, a cis-1,4 bond content of 75% or higher, and an active end, using an alkoxysilane compound, and a step of carrying out a condensation reaction in the presence of a condensation accelerator comprising a compound of an element belonging to at least one of the groups 4A (excluding Ti), 2B, 3B, and 5B of the periodic table.

In the production process of the present invention, it is preferable that the condensation accelerator be a compound containing zirconium (Zr), bismuth (Bi), or aluminum (Al) and it is more preferable that the compound constituting the condensation accelerator be an alkoxide, a carboxylate, or an acetylacetonato complex salt of these elements.

Also, it is preferable that the alkoxysilane compound comprise at least one functional group selected from the following (a) to (c):

(a) an epoxy group;

(b) an isocyanate group; and (c) a carboxyl group.

In addition, it is preferable that the condensation accelerator be specifically at least one compound selected from the following (d) to (h):

(d) a bismuth carboxylate;

(e) a zirconium alkoxide;

(f) a zirconium carboxylate;

(g) an aluminum alkoxide; and (h) an aluminum carboxylate.

In the production process of the present invention, it is further preferable to add a compound having at least one functional group selected from the following (i) to (k) when reacting the alkoxysilane compound by the modification reaction:

(i) an amino group;

(j) an imino group; and (k) a mercapto group.

Also, in the present invention, it is preferable that the conjugated diene compound constituting the modified polymer be at least one conjugated diene compound selected from 1,3-butadiene, isoprene, and 2,3-dimethyl-1,3-butadiene.

In the present invention, it is preferable that the conjugated diene polymer having an active end be a polymer obtained by polymerizing a conjugated diene compound using a catalyst containing the following components (l) to (n) as the main components:

(l) a compound containing a rare earth element having an atomic number of 57 to 71 in the periodic table or a reaction product of such compound with a Lewis base;

(m) an alumoxane and/or an organoaluminum compound of the formula $AlR^1R^2R^3$ (wherein $R^1$ and $R^2$, which may be the same or different, are hydrocarbon groups having 1 to 10 carbon atoms or are hydrogen atoms, and $R^3$ is a hydrocarbon group having 1 to 10 carbon atoms and may be the same as or different from $R^1$ or $R^2$); and (n) a halogen-containing compound.

Also, according to the present invention, a modified polymer obtained by the production process described above, and a rubber composition comprising this modified polymer are also provided. It is preferable that such a rubber composition comprise silica and/or carbon black in an amount of 20 to 100 parts by mass per 100 parts by mass of a rubber component including 20% by mass or more of the modified polymer.

Furthermore, in the above-mentioned rubber composition, it is preferable that the rubber component comprise 20 to 100% by mass of the above-mentioned modified polymer and 80 to 0% by mass of at least one other rubber selected from the group consisting of natural rubber, a synthetic isoprene rubber, a butadiene rubber, a styrene-butadiene rubber, an ethylene/α-olefin copolymer rubber, an ethylene/α-olefin-diene copolymer rubber, an acrylonitrile/butadiene copolymer rubber, a chloroprene rubber, and a halogenated butyl rubber (with the proviso that amount of modified polymer+amount of other rubber(s)=100% by mass).

According to the present invention, the excellent effect of being able to provide a rubber composition having excellent fracture characteristics, low heat buildup, low temperature characteristics, and abrasion resistance when subjected to vulcanization treatment to form a vulcanized rubber as well as excellent processability is achieved in either case of adding silica or carbon black to the resulting modified conjugated diene polymer.

BEST MODE FOR CARRYING OUT THE INVENTION

Embodiments of the present invention are described below in detail. However, the present invention is not limited to these embodiments.

A production process of the present invention comprises a step of carrying out a modification reaction on an active end of a conjugated diene polymer having a vinyl content of below 10%, a cis-1,4 bond content of 75% or higher, and an active end, using an alkoxysilane compound, and a step of carrying out a condensation reaction in the presence of a condensation accelerator comprising a compound of an element belonging to at least one of the groups 4A (excluding Ti), 2B, 3B, and 5B of the periodic table is provided.

Incidentally, the condensation accelerator is usually added after the alkoxysilane compound has been added to the active end of the conjugated diene polymer to carry out the modification reaction and before the condensation reaction, however the condensation accelerator may be added before the addition of the alkoxysilane compound (before the modification reaction), in which case the condensation reaction is carried out after the modification reaction by the addition of the alkoxysilane compound.

A production process of the above-mentioned conjugated diene polymer having a vinyl content of below 10%, a cis-1,4 bond content of 75% or higher, and an active end can be carried out using a solvent or under solvent-free conditions. Examples of the polymerization solvent include inert organic solvents, for example, saturated aliphatic hydrocarbons having 4 to 10 carbon atoms such as butane, pentane, hexane, and heptane; saturated cyclic hydrocarbons having 6 to 20 carbon atoms such as cyclopentane and cyclohexane; aromatic hydrocarbons such as monoolefins (e.g. 1-butene and 2-butene), benzene, toluene, and xylene; and halogenated hydrocarbons such as methylene chloride, chloroform, carbon tetrachloride, trichloroethylene, perchloroethylene, 1,2-dichloroethane, chlorobenzene, bromobenzene, and chlorotoluene.

The temperature of the polymerization reaction in the present invention is normally from −30° C. to +200° C. and preferably from 0° C. to +150° C. There are no particular limitations on the form of the polymerization reaction. The reaction may be either carried out using a batch type reactor or continuously carried out using an apparatus such as a multi-stage continuous reactor.

When a polymerization solvent is used, a monomer concentration in this solvent is normally from 5 to 50% by mass, and preferably from 7 to 35% by mass.

In order to produce the polymer and to prevent the active end-containing polymer from being inactivated, care must be taken to decrease as much as possible the inclusion of a compound having an inactivation function, such as oxygen, water, or carbon dioxide gas, in the polymerization system.

Examples of conjugated diene compounds used as polymerization monomers in the present invention include 1,3-Butadiene, isoprene, 2,3-dimethyl-1,3-butadiene, 1,3-pentadiene, 1,3-hexadiene, and myrcene. Preferably, 1,3-Butadiene, isoprene, and 2,3-dimethyl-1,3-butadiene are included. These conjugated diene compounds can be used either individually or in combination of two or more types. A copolymer is obtained when two or more types of conjugated diene compounds are used in combination.

There are no particular limitations to the method for producing the above-mentioned active end-containing conjugated diene polymer, and a method known in the art can be used. However, as the polymerization catalyst, it is preferable that a combination of at least one compound selected from each of the following components (l), (m), and (n) be used:

Component (l):

Component (l) is a compound containing a rare earth element having an atomic number of 57 to 71 in the periodic table or a reaction product of such compound with a Lewis base.

The preferable rare-earth element is neodymium, praseodymium, cerium, lanthanum, gadolinium, or a combination thereof and more preferable is neodymium.

The rare earth element-containing compound of the present invention is a carboxylate, an alkoxide, a β-diketone complex, a phosphate, or a phosphite.

The carboxylate of the rare earth element is represented by the general formula $(R^4—CO_2)_3M$, wherein M is a rare earth element having an atomic number of 57 to 71 in the periodic table; $R^4$ indicates a hydrocarbon group having 1 to 20 carbon atoms, preferably a saturated or unsaturated alkyl group, which is linear, branched, or cyclic; and the carboxyl group is bonded to a primary, secondary, or tertiary carbon atom of the hydrocarbon group. Specific examples thereof include salts of octanoic acid, 2-ethylhexanoic acid, oleic acid, stearic acid, benzoic acid, naphthenic acid and Versatic Acid (a trade name of a product manufactured by Shell Chemicals Limited, a carboxylic acid in which a carboxyl group is bonded to a tertiary carbon atom). A salt of 2-ethylhexanoic acid, naphthenic acid, or Versatic Acid is preferable.

The alkoxide of the rare earth element is represented by the general formula of $(R^5O)_3M$, wherein M is a rare earth element having an atomic number of 57 to 71 in the periodic table; $R^5$ indicates a hydrocarbon group having 1 to 20 carbon atoms, preferably a saturated or unsaturated alkyl group, which is linear, branched, or cyclic; and the carboxyl group is bonded to a primary, secondary, or tertiary carbon atom of the hydrocarbon group. Examples of alkoxy groups represented by R⁵O include alkoxy groups of 2-ethylhexyl, oleyl, stearyl, phenyl, benzyl, and the like. Of these, the alkoxy group of 2-ethylhexyl or benzyl is preferable.

Examples of the β-diketone complex of the rare earth elements include acetylacetone, benzoylacetone, propionylacetone, valerylacetone, and ethylacetylacetone complexes of the rare earth elements. Among these, acetylacetone and ethylacetylacetone complexes are preferable.

Examples of the phosphate or phosphite of the rare-earth elements include rare-earth element salts of bis(2-ethylhexyl)phosphate, bis(1-methylheptyl)phosphate, bis(p-nonylphenyl)phosphate, bis(polyethylene glycol p-nonylphenyl)phosphate, (1-methylheptyl)(2-ethylhexyl)phosphate, (2-ethylhexyl)(p-nonylphenyl)phosphate, mono-2-ethylhexyl 2-ethylhexylphosphonate, mono-p-nonylphenyl 2-ethylhexylphosphonate, bis(2-ethylhexyl)phosphinic acid, bis(1-methylheptyl)phosphinic acid, bis(p-nonylphenyl)phosphinic acid, (1-methylheptyl)(2-ethylhexyl)phosphinic acid, and (2-ethylhexyl)(p-nonylphenyl)phosphinic acid. As preferable examples thereof, the salts of bis(2-ethylhexyl)phosphate, bis(1-methylheptyl)phosphate, mono-2-ethylhexyl 2-ethylhexylphosphonate, and bis(2-ethylhexyl)phosphinic acid.

Of the compounds exemplified above, the phosphates of neodymium and the carboxylates of neodymium are particularly preferable and carboxylates such as neodymium 2-ethylhexanoate and neodymium versatate are most preferable.

The Lewis base for easy solubilization of the above-mentioned rare earth element compound in the solvent is used in an amount of 0 to 30 mol, preferably 1 to 10 mol, per mol of the metal compound of the rare-earth element as a mixture with the metal compound of the rare-earth element or as a product obtained by reacting both in advance.

Examples of the Lewis base used here include acetylacetone, tetrahydrofuran, pyridine, N,N-dimethylformamide, thiophene, diphenyl ether, triethylamine, an organic phosphorous compound, and a monohydric or a dihydric alcohol.

The component (l) described above can be used either alone or as a combination of two or more types thereof.

Component (m):

Component (m) is an alumoxane and/or an organoaluminum compound of the formula $AlR^1R^2R^3$ (wherein $R^1$ and $R^2$, which may be the same or different, are hydrocarbon groups having 1 to 10 carbon atoms or are hydrogen atoms, and $R^3$ is a hydrocarbon group having 1 to 10 carbon atoms and may be the same as or different from $R^1$ or $R^2$). Two or more components of component (m) can be used at the same time.

The alumoxane used as a catalyst of the present invention is a compound having a structure represented by the below-mentioned formula (I) or (II). Also, the alumoxane may be an alumoxane associate as shown in Fine Chemical, 23 (9), 5 (1994); J. Am. Chem. Soc., 115, 4971 (1993); and J. Am. Chem. Soc., 117, 6465 (1995).

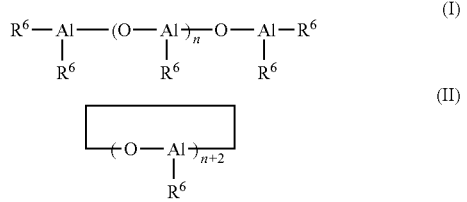

wherein $R^6$s, which may be the same or different, are hydrocarbon groups having 1 to 20 carbon atoms and n is an integer of 2 or more.

In the alumoxane represented by formula (I) or (II), examples of the hydrocarbon groups represented by $R^6$ include methyl, ethyl, propyl, butyl, isobutyl, t-butyl, hexyl, isohexyl, octyl, and isooctyl groups. Methyl, ethyl, isobutyl and t-butyl groups are preferable, and a methyl group is particularly preferable. n is an integer of 2 or more and preferably an integer of 4 to 100.

Specific examples of the alumoxane include methylalumoxane, ethylalumoxane, n-propylalumoxane, n-butylalumoxane, isobutylalumoxane, t-butylalumoxane, hexylalumoxane, and isohexylalumoxane.

The alumoxane may be produced by any technique known in the art, for example, by adding a trialkylaluminum or a dialkylaluminum monochloride to an organic solvent such as benzene, toluene, or xylene, and further adding water, water vapor, water vapor-containing nitrogen gas or a salt containing crystal water such as copper sulfate pentahydrate or aluminum sulfate hexadecahydrate.

The alumoxanes can be used either alone or in combination of two or more types.

Examples of $AlR^1R^2R^3$ (wherein $R^1$ and $R^2$, which may be the same or different, are hydrocarbon groups having 1 to 10 carbon atoms or hydrogen atoms, and $R^3$ is a hydrocarbon group having 1 to 10 carbon atoms and may be the same as or different from $R^1$ or $R^2$), which is the other component (m) used as the catalyst of the present invention include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, and isobutylaluminum dihydride. Of these, triethylaluminum, triisobutylaluminum, diethylaluminum hydride, and diisobutylaluminum hydride are preferable.

The organoaluminum compounds, as component (m) of the present invention, can be used either alone or as a mixture of two or more types.

Component (n):

The component (n) used as the catalyst of the present invention is a halogen-containing compound, and preferably includes reaction products of a metal halide and a Lewis base, diethyl aluminum chloride, silicon tetrachloride, trimethylchlorosilane, methyldichlorosilane, dimethyldichlorosilane, methyltrichlorosilane, ethylaluminum dichloride, ethylaluminum sesquichloride, tin tetrachloride, tin trichloride, phosphorus trichloride, benzoyl chloride, and t-butyl chloride.

Examples of the metal halide include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Of these, magnesium chloride, calcium chloride, barium chloride, manganese chloride, zinc chloride, and copper chloride are preferable, and magnesium chloride, manganese chloride, zinc chloride, and copper chloride are particularly preferable.

As a Lewis base to be reacted in order to produce the reaction product with above-mentioned metal halides, a phosphorus compound, a carbonyl compound, a nitrogen compound, an ether compound, an alcohol, and the like are preferable. Specific examples include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic Acid (a trade name of a product manufactured by Shell Chemicals Limited, the product being a carboxylic acid in which a carboxyl group is bonded to a tertiary carbon atom), triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, and lauryl alcohol, with preferable compounds being tri-2-ethylhexyl phosphate, tricresyl phosphate, acetylacetone, 2-ethylhexanoic acid, versatic acid, 2-ethylhexyl alcohol, 1-decanol, and lauryl alcohol.

The above-mentioned Lewis base is reacted in an amount of 0.01 to 30 mol, preferably 0.5 to 10 mol, per mol of the metal halide. The use of the product reacted with a Lewis base can reduce the amount of metal remaining in the polymer.

The amount or ratio of each component of the catalyst used in the present invention is specified to be various values according to the objective or necessity.

Among these, the component (l) is preferably used in an amount of 0.00001 to 1.0 mmol per 100 g of the conjugated diene compound. When the amount is below 0.00001 mmol, the polymerization activity is undesirably low; and when the amount is beyond 1.0 mmol, the catalyst concentration is so high that a catalyst removing step may be undesirably required. It is particularly preferable to use the component (l) in an amount of 0.0001 to 0.5 mmol.

Generally, the amount of the component (m) to be used can be expressed by the molar ratio of Al to the component (l), and the ratio of the component (l) to the component (m) is 1:1 to 1:500, preferably 1:3 to 1:250, and more preferably 1:5 to 1:200.

Also, the molar ratio of the component (l) to the component (n) used is 1:0.1 to 1:30, and preferably 1:0.2 to 1:15.

The catalyst amount or the catalyst component ratio outside of the above ranges is undesirable, because the catalyst does not act as a highly active catalyst or a catalyst removal step is required. In addition to the above-mentioned components (l) to (n), hydrogen gas may be used in the polymerization reaction in order to adjust the molecular weight of the polymer.

In addition to the above-mentioned components (l) to (n), it is possible to use a conjugated diene compound and/or a nonconjugated diene compound in an amount of 0 to 1,000 mol per mol of the compound of the component (l). The same monomers used for polymerization, such as 1,3-butadiene, isoprene can be used as the conjugated diene compound for preparing the catalyst. Examples of the nonconjugated diene compound include divinylbenzene, diisopropenylbenzene, triisopropenylbenzene, 1,4-vinylhexadiene, and ethylidene norbornene. Although the conjugated diene compound is not indispensable as a catalyst component, the addition of a conjugated diene compound has an advantage of further improving the catalytic activity.

The process of producing the catalyst in the present invention comprises, for example, reacting the components (l) to (n) and, as necessary, the conjugated diene compound and/or nonconjugated diene compound. In that case, the order of adding each component can be arbitrarily determined. Mixing, reacting, and aging these components in advance is preferable in terms of increasing the polymerization activity and reducing the polymerization initiation induction period. The aging temperature here is usually 0 to 100° C., and preferably 20 to 80° C. When the temperature is below 0° C., the aging is not sufficient; and when the temperature is beyond 100° C., undesirably the catalytic activity decreases and the molecular weight distribution broadens. There are no particular limitations to the aging time. It is possible to bring the components into contact with each other before adding to the polymerization reaction vessel. Normally, 0.5 minute or more of aging time is sufficient to keep the mixture stable for a few days.

The active end-containing conjugated diene polymer mentioned above has a vinyl content of below 10%, preferably below 5%, and more preferably below 2%; and a cis-1,4-bond content of 75% or more, preferably 85% or more, and more preferably 90 to 99.9%. The ratio (Mw/Mn) of the weight average molecular weight (Mw) to the number average molecular weight (Mn) determined by gel permeation chromatography of the conjugated diene polymer is preferably 1.01 to 5, and more preferably 1.01 to 4.

When the vinyl content of the conjugated diene polymer is 10% or more or the cis-1,4-bond content is below 75%, the mechanical characteristics and abrasion resistance after vulcanization are inferior. And when Mw/Mn is beyond 5, the mechanical characteristics, abrasion resistance, and low heat buildup after vulcanization are also inferior.

The vinyl content and the cis-1,4-bond content here can be easily adjusted by controlling the polymerization temperature, and the Mw/Mn ratio can be easily adjusted by controlling the molar ratio of the components (l) to (n).

The Mooney viscosity ($ML_{1+4}$, 100° C.) of the above-mentioned active end-containing conjugated diene polymer is in a range from 5 to 50, preferably from 10 to 40. When the Mooney viscosity is below 5, the mechanical characteristics, abrasion resistance, and the like after vulcanization are inferior. On the other hand, when the Mooney viscosity is beyond 50, processability during kneading the modified conjugated diene polymer after the modification and condensation reaction is inferior.

The Mooney viscosity can be easily adjusted by controlling the molar ratio of the components (l) to (n).

In the present invention, an active end of the conjugated diene polymer having a vinyl content of below 10% and a cis-1,4-bond content of 75% or more obtained as mentioned above is reacted with an alkoxysilane compound by a modification reaction. Although the type of the alkoxysilane compound used for the modification reaction (hereinafter sometimes referred to as "modification agent") is not particularly limited, an alkoxysilane compound comprising at least one functional group selected from (a) an epoxy group, (b) an isocyanate group, and (c) a carboxyl group can be preferably used. The alkoxysilane compound may be either a partial condensate or a mixture of the alkoxysilane compound and a partial condensate.

Here, the partial condensate refers to a compound in which a part (not all) of the SiORs of the alkoxysilane compound is bonded by the SiOSi bond by condensation.

It is preferable that the polymer used in the above-mentioned modification reaction contains at least 10% of polymer chains having living properties.

Specific examples of the alkoxysilane compound used for the reaction with the active end of the polymer preferably include epoxy group-containing alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, methyl(3-glycidoxypropyl)dimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. Among these, 3-glycidoxypropyltrimethoxysilane and 2-(3,4-epoxycyclohexyl)ethyltrimethoxysilane are especially suitable.

Also, examples of isocyanate group-containing alkoxysilane compounds include 3-isocyanatepropyltrimethoxysilane, 3-isocyanatepropyltriethoxysilane, 3-isocyanatepropylmethyldiethoxysilane, and 3-isocyanatepropyltriisopropoxysilane. Among these, 3-isocyanatepropyltriisopropoxysilane is particularly preferable.

Further, examples of carboxyl group-containing alkoxysilane compounds include 3-methacryloyloxypropyltriethoxysilane, 3-methacryloyloxypropyltrimethoxysilane, 3-methacryloyloxypropylmethyldiethoxysilane, and 3-methacryloyloxypropyltriisopropoxysilane. Among these, 3-methacryloyloxypropyltrimethoxysilane is particularly preferable.

These alkoxysilane compounds may be used either individually or in combination of two or more types. A partial condensate of these alkoxysilane compounds can also be used.

The amount of the alkoxysilane compounds used in the modification reaction using an above-mentioned modification agent, in terms of the molar ratio to the component (l), is preferably 0.01 to 200, more preferably 0.1 to 150. When the amount is below 0.01, the modification reaction does not sufficiently proceed to sufficiently improve dispersibility of the filler, resulting in inferior mechanical characteristics, abrasion resistance, and low heat buildup after vulcanization. On the other hand, the amount exceeding the molar ratio of 200 is uneconomical, since the modification reaction is saturated.

Incidentally, the method of adding the modification agent is not particularly limited. There are given some examples such as method of adding the entire amount at one time, a method of adding in portions, a method of adding continuously. However, the method of adding the entire amount at one time is preferable.

A solution reaction (a solution may contain unreacted monomers used in the polymerization reaction) is preferably applied to the modification reaction in the present invention.

There are no particular limitations to the form of the modification reaction. The reaction may be either carried out using a batch type reactor or continuously carried out using a multistage continuous reactor or an apparatus such as an inline mixer. It is important that the modification reaction is carried out after completion of the polymerization reaction, but before conducting a solvent removal treatment, water treatment, a heat treatment, and various operations for isolating the polymers.

The same temperature as the polymerization temperature for producing the conjugated diene polymer can be used for the modification reaction. Specifically, temperatures of 20 to 100° C. can be given as a preferable range. A more preferable temperature range is 40 to 90° C. When the temperature is low, the viscosity of the polymer undesirably tends to increase; and when the temperature is high, the polymerization active end undesirably becomes easy to deactivate.

The modification reaction time is usually from 5 minutes to 5 hours, and preferably from 15 minutes to 1 hour.

In the present invention, an aging inhibitor and a reaction termination agent known in the art may be optionally added in a step after introducing the alkoxysilane compound residue into the active end of the polymer.

In the present invention, a compound having a functional group (hereinafter sometimes referred to as "a functional group-introducing agent") may be further added. The functional group-introducing agent is preferably added in a step after introducing the alkoxysilane compound residue into the active end of the above-mentioned polymer. There are no specific limitations to the functional group-introducing agent insofar as such the agent can introduce a functional group during the polymerization. However, an alkoxysilane compound having a functional group is preferable from the viewpoint of ensuring good abrasion resistance.

Although not specifically limited, it is preferable that the functional group-introducing agent be added before initiation of the condensation reaction. When added after initiation of the condensation reaction, the functional group-introducing agent may not homogeneously disperse, resulting in reduced catalyst performance. The functional group-introducing agent is added preferably at 5 minutes to 5 hours, and particularly preferably at 15 minutes to one hour after initiation of the condensation reaction.

Here, the functional group-introducing agent usually does not substantially react directly with the active end, and remains unreacted in the reaction system. It is consumed by the condensation reaction with an alkoxysilane compound residue introduced into the active end in the step of condensation reaction.

As a further added functional group-introducing agent, an alkoxysilane compound comprising at least one functional group selected from (d) an amino group, (e) an imino group, and (f) a mercapto group can be given. The alkoxysilane compound used as the functional group-introducing agent may be either a partial condensate or a mixture of the alkoxysilane compound and a partial condensate.

Specific examples of the further added functional group-introducing agent include amino group-containing alkoxysilane compounds such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, and 3-(N-methylamino)propyltriethoxysilane. Among these, 3-diethylaminopropyl(triethoxy)silane, 3-dimethylaminopropyl(triethoxy)silane, and 3-aminopropyltriethoxysilane are preferable.

Examples of imino group-containing alkoxysilane compounds include 3-(1-hexamethyleneimino)propyl(triethoxy)silane, 3-(1-hexamethyleneimino)propyl(trimethoxy)silane, (1-hexamethyleneimino)methyl(trimethoxy)silane, methyl(1-hexamethyleneimino)(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane, N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, trimethoxysilyl compounds, methyldiethoxysilyl compounds, ethyldiethoxysilyl compounds, methyldimethoxysilyl compounds, and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-iso-propoxysilylpropyl)-4,5-dihydroimidazole, and N-(3-methyldiethoxysilylpropyl)-4,5-dihydroimidazole. Of these, 3-(1-hexamethyleneimino)propyl(triethoxy)silane, N-(1-methylpropylidene)-3-(triethoxysilyl)-1-propanamine, N-(1,3-dimethylbutylidene)-3-(triethoxysilyl)-1-propanamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, and N-(3-triethoxysilylpropyl)-4,5-dihydroimidazole are preferable.

Examples of mercapto group-containing alkoxysilane compounds include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, and mercaptophenyltriethoxysilane. Among these, 3-mercaptopropyltriethoxysilane is preferable.

These functional group-introducing agents may be used either individually or in combination of two or more types.

When a functional group-containing alkoxysilane compound is used as a functional group-introducing agent in the modification process of the present invention, the active end-containing polymer reacts with a substantially stoichiometric amount of the alkoxysilane compound added to the reaction system, whereby the alkoxysilyl group is introduced to substantially all the ends (modification reaction). Then, by further adding the alkoxysilane compound, the alkoxysilane compound residues in an amount larger than the equivalent of the active end can be introduced.

The condensation reaction among the alkoxysilyl groups is preferably a reaction between a (remaining or further added) free alkoxysilane and an alkoxysilyl group of the polymer terminals, or, depending on circumstances, a reaction between alkoxysilyl groups on the polymer terminals. The reaction among free alkoxysilanes is unnecessary. Therefore, when an alkoxysilane compound is further added, the hydrolyzability of the alkoxysilyl group is preferably not greater than the hydrolyzability of the alkoxysilyl groups on the polymer terminals from the viewpoint of the efficiency. For example, it is preferable to use a trimethoxysilyl group-containing compound with a large hydrolyzability as the alkoxysilane compound for the reaction with the active end of the polymer, and to use a compound having a less hydrolyzable alkoxysilyl group (for example, triethoxysilyl group) as the further added alkoxysilane compound. On the contrary, using a triethoxysilyl group-containing compound as the alkoxysilane compound for the reaction with the active end of the polymer, and a trimethoxysilyl group-containing compound as the further-added alkoxysilane compound is not preferable from the viewpoint of reaction efficiency, although this is within the scope of the present invention.

The amount of the functional group-containing alkoxysilane compound used as the functional group-introducing agent, in terms of the molar ratio to the component (g), is preferably from 0.01 to 200, and still more preferably from 0.1 to 150. When the molar ratio is below 0.01, the condensation reaction does not sufficiently proceed to sufficiently improve dispersibility of the filler, resulting in inferior mechanical characteristics, abrasion resistance, and low heat buildup after vulcanization. On the other hand, an amount exceeding the molar ratio of 200 is uneconomical, since the condensation reaction is saturated.

A specific condensation accelerator is used in the present invention in order to accelerate the condensation reaction of the above-mentioned alkoxysilane compound used as the modification agent (and the functional group-containing alkoxysilane compound which may be used as the functional group-introducing agent).

Although the condensation accelerator may be added before the modification reaction, it is preferable to add it after the modification reaction and before the initiation of the condensation reaction. When added before the modification reaction, the condensation accelerator may directly react with the active end, failing to introduce the alkoxysilyl group into the active end. When added after initiation of the condensation reaction, the condensation accelerator may not homogeneously disperse, resulting in reduced catalytic performance. The condensation accelerator is added normally at 5 minutes to 5 hours, and preferably at 15 minutes to one hour after initiation of the modification reaction.

The condensation accelerator used in the present invention comprises a compound of an element belonging to at least one of the groups 4A (excluding Ti), 2B, 3B, and 5B of the periodic table. Specifically, the above-mentioned condensation accelerator is a compound comprising zirconium (Zr), bismuth (Bi), or aluminum (Al), and it is more preferable that the compound is an alkoxide, carboxylate, or acetylacetonato complex salt of these elements. Of these compounds, at least one of the compounds selected from the following (d) to (h) is particularly preferable.

(d) a bismuth carboxylate;

(e) a zirconium alkoxide;

(f) a zirconium carboxylate;

(g) an aluminum alkoxide; and (h) an aluminum carboxylate.

Specific examples of the condensation accelerator include tris(2-ethylhexanoate)bismuth, tris(laurate)bismuth, tris(naphthate)bismuth, tris(stearate)bismuth, tris(oleate)bismuth, tris(linolate)bismuth, tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconiumtributoxyacetylacetonate, zirconiumdibutoxybis(acetylacetonate), zirconiumtributoxyethylacetoacetate, zirconiumbutoxyacetylacetonate bis(ethylacetoacetate), zirconiumtetrakis(acetylacetonate), zirconiumdiacetylacetonatebis(ethylacetoacetate), bis(2-ethylhexanoate)zirconiumoxide, bis(laurate)zirconiumoxide, bis(naphthate)zirconiumoxide, bis(stearate)zirconiumoxide, bis(oleate)zirconiumoxide, bis(linolate)zirconiumoxide, tetrakis(2-ethylhexanoate)zirconium, tetrakis(laurate)zirconium, tetrakis(naphthate)zirconium, tetrakis(stearate)zirconium, tetrakis(oleate)zirconium, tetrakis(linolate)zirconium, triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminumtris(acetylacetonate), aluminumtris(ethylacetoacetate), tris(2-ethylhexanoate)aluminum, tris(laurate)aluminum, tris(naphthate)aluminum, tris(stearate)aluminum, tris(oleate)aluminum, and tris(linolate)aluminum. Of these, tris(2-ethylhexanoate)bismuth, tetra-n-propoxyzirconium, tetra-n-butoxyzirconium, bis(2-ethylhexanoate)zirconiumoxide, bis(oleate)zirconiumoxide, tri-i-propoxyaluminum, tri-sec-butoxyaluminum, tris(2-ethylhexanoate)aluminum, tris(stearate)aluminum, zirconiumtetrakis(acetylacetonate), and aluminumtris(acetylacetonate) are preferable.

The amount of the condensation accelerator used, in terms of the molar ratio of the above compound to the total amount of alkoxysilyl groups existing in the reaction system, is preferably from 0.1 to 10, and particularly preferably from 0.5 to 5. When the molar ratio is below 0.1, the condensation reaction may not sufficiently proceed. On the other hand, the amount exceeding 10 is uneconomical since the effect as a condensation accelerator is saturated.

The condensation reaction of the present invention is carried out in an aqueous solution. The temperature of the condensation reaction is preferably 85 to 180° C., more preferably 100 to 170° C., and particularly preferably 110 to 150° C., and the pH of the aqueous solution is preferably 9 to 14, and more preferably 10 to 12.

When the temperature of the condensation reaction is below 85° C., the condensation reaction proceeds only slowly and may not be completed. The properties of the resulting modified conjugated diene polymer may change over time and cause problems of product quality. On the other hand, if the temperature is beyond 180° C., the aging reaction of the polymer may proceed undesirably, resulting in impaired properties.

When the pH of the aqueous solution during the condensation reaction is below 9, the condensation reaction proceeds only slowly and may not be completed. The resulting modified conjugated diene polymer may change over time and cause quality problems. On the other hand, when the pH of the aqueous solution during the condensation reaction is beyond 14, a large amount of residue originating from alkaline compounds may remain in the resulting modified conjugated diene polymer after isolation. It is difficult to remove such a residue.

The condensation reaction time is usually from 5 minutes to 10 hours, and preferably from 15 minutes to 5 hours. When the reaction time is below 5 minutes, the condensation reaction is not completed. The condensation reaction is saturated when the reaction time is beyond 10 hours.

Incidentally, the pressure of the reaction system during the condensation reaction is usually 0.01 to 20 MPa, and preferably 0.05 to 10 MPa.

There are no specific limitations to the method of the condensation reaction. Either a reaction using a batch reactor or a continuous reaction using an apparatus such as a multistage continuous reactor may be applicable. The condensation reaction may be carried out simultaneously with solvent removal.

After the condensation treatment in the manner mentioned above, the product is post-treated by a known method to obtain the target modified conjugated diene polymer.

The Mooney viscosity ($ML_{1+4}$, 100° C.) of the modified conjugated diene polymer of the present invention is preferably 10 to 150, and still more preferably 15 to 100. When the Mooney viscosity is low, rubber properties such as fracture characteristics tend to decrease; and when the Mooney viscosity is high, not only is processability impaired, but it is also difficult to knead the polymer with other compositions.

The rubber composition of the present invention preferably contains at least 20% by mass of the modified conjugated diene polymer as a rubber component. When the amount is below 20% by mass, it is difficult to obtain a rubber composition with desired properties, and the object of the present invention may not be achieved. A more preferable content of the modified conjugated diene polymer in the rubber component is 30% by mass or more, particularly 40% by mass or more.

This modified conjugated diene polymer may either be used alone or in combination of two or more types. As other rubber components that can be used in combination with the modified conjugated diene polymer, there are given a natural rubber, a synthetic isoprene rubber, a butadiene rubber, a styrene-butadiene rubber, an ethylene/α-olefin copolymer rubber, an ethylene/α-olefin-diene copolymer rubber, an acrylonitrile-butadiene copolymer rubber, a chloroprene rubber, and a halogenated butyl rubber, as well as a mixture of these rubbers. A part of the rubber components may be a polyfunctional type, for example, having a branched structure by using a modifier such as tin tetrachloride or silicon tetrachloride.

It is preferable that the rubber composition of the present invention comprises silica and/or carbon black as a filler.

There are no limitations to the silica. Examples of silica include wet silica (hydrous silicic acid), dry silica (silicic anhydride), calcium silicate, and aluminum silicate. Of these, wet silica, which brings about a most remarkable improvement effect on fracture resistance, and compatible effect of wet grip characteristics, and low rolling resistance, is preferable.

There are no limitations to the carbon black either. For example, SRF, GPF, FEF, HAF, ISAF, and SAF are used. A carbon black with an iodine adsorption (IA) of 60 mg/g or more and a dibutyl phthalate oil absorption (DBP) of 80 ml/100 g or more is preferable. Grip performance and fracture resistance are increased by using carbon black. However, HAF, ISAF, and SAF, which are excellent in abrasion resistance, are particularly preferable.

The silica and/or carbon black may either be used alone or in combination of two or more types.

The preferable amount of silica and/or carbon black is 20 to 120 parts by mass per 100 parts by mass of the rubber component, with 25 to 100 parts by mass being more preferable in terms of reinforcement and improvement effects on various properties due to the reinforcement. When the amount is too small, improvement effect of fracture resistance and the like is insufficient; when too large, the rubber composition tend to exhibit poor processability.

The rubber composition of the present invention comprises the modified conjugated diene polymer obtained by the above-mentioned method. Usually, a composition comprising a rubber component which contains at least 20% by mass of the modified conjugated diene polymer, and silica and/or carbon black preferably in an amount of 20 to 120 parts by mass, more preferably 25 to 120 parts by mass, per 100 parts by mass of the rubber component, is used.

When silica is used as a filler for reinforcement in the rubber composition of the present invention, a silane coupling agent may be added in order to further increase the reinforcing strength. Examples of the silane coupling agent include, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)

tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N, N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazolyltetrasulfide. Among these, bis(3-triethoxysilylpropyl)polysulfide and 3-trimethoxysilylpropylbenzothiazolyltetrasulfide are preferable in terms of reinforcement improvement effect or the like.

These silane coupling agents may be used either individually or in combination of two or more types.

Since a modified polymer containing a functional group having high affinity with silica introduced into the molecule terminal is used as a rubber component in the rubber composition of a present invention, the amount of a silane coupling agent to be contained may be smaller than that in ordinary cases. Although the preferable amount differs according to the type of the silane coupling agent, an amount is usually selected from the range of 1 to 20% by mass of silica. When the amount is too small, the effect of the silane coupling agent is not sufficiently exhibited; when too large, the rubber component may gel. In terms of the effect as a coupling agent and antigelling properties, a preferable amount of the coupling agent is from 3 to 15% by mass.

Various chemicals which are commonly used in the rubber industry such as a vulcanizing agent, a vulcanization accelerator, a process oil, an aging inhibitor, an antiscorching agent, zinc oxide, and stearic acid may optionally be added to the rubber composition of the present invention insofar as the objective of the present invention is not impaired.

The rubber composition of the present invention can be obtained by kneading the above components using a kneader, for example, an open-type kneading machine such as a roll or a closed-type kneading machine such as a Banbury mixer. After molding, the molded rubber composition is vulcanized to obtain various rubber products. For example, the rubber composition can suitably be used for tires such as tire treads, under treads, carcasses, side walls, and beads, as well as other industrial products such as vibration-proof rubber, fender beams, belts, and hoses. However, it is particularly suitable for tire treads.

EXAMPLES

The present invention will hereinafter be described more specifically based on examples, however, it is to be understood that these examples are not intended to limit the present invention.

In the examples below, "parts" and "%" indicate "parts by mass" and "% by mass" respectively, unless otherwise specified.

Various properties in the examples were measured according to the following methods.

Mooney Viscosity ($ML_{1+4}$, 100° C.):

Measured under the conditions of a preheating time of 1 minute and measuring time of 4 minutes at a temperature of 100° C.

Molecular Weight Distribution (Mw/Mn):

Measured using HLC-8120GPC™ (manufactured by Tosoh Corp.) and a refractive index detector as a detector under the following conditions.

Column: GMHHXL™ Manufactured by Tosoh Corp.

Mobile Phase: Tetrahydrofuran

Microstructure (Cis-1,4 Bond Content, 1,2-Vinyl Bond Content):

IR spectroscopy (Morelo method) was used.

pH of Aqueous Solutions:

A pH meter was used.

Tensile Strength ($T_B$):

Measured according to JIS K6301.

Low Heat Buildup (3% tan δ):

Measured using a dynamic spectrometer manufactured by Rheometrix Co. (USA) under the conditions of a tensile dynamic strain of 3% and a frequency of 15 Hz at 50° C. The results are shown by an index. The larger the index, the lower the heat buildup and the better the performance.

Low Temperature Properties (−20° C.G'):

Measured using a dynamic spectrometer manufactured by Rheometrix Co. (USA) under the conditions of a tensile dynamic strain of 0.1% and a frequency of 15 Hz at −20° C. The results are shown by an index. The larger the index, the larger the low temperature properties (grip performance on a snowy and an icy road surface).

Abrasion Resistance:

Measured using a Lambourn-type abrader (manufactured by Shimada Giken Co., Ltd.) at a slip ratio of 60% at a room temperature (ca. 22° C.). The larger the index, the better the abrasion resistance.

Example 1

Preparation of Modified Polymer A

A 5 L autoclave of which the internal atmosphere was replaced by nitrogen was charged with 2.4 kg of cyclohexane and 300 g of 1,3-butadiene. A catalyst, prepared from a cyclohexane solution of neodymium versatate (0.09 mmol), a toluene solution of methyl alumoxane (hereinafter sometimes referred to as MAO) (1.8 mmol), hydrogenation diisobutylaluminum (hereinafter sometimes referred to as DIBAH) (5.0 mmol), a toluene solution of diethylaluminum chloride (0.18 mmol), and 1,3-butadiene (4.5 mmol) by reacting and aging at 50° C. for 30 minutes, was added to polymerize the monomers at 80° C. for 60 minutes. The reaction conversion rate of 1,3-butadiene was almost 100%. The polymer solution of 200 g was extracted and a methanol solution containing 1.5 g of 2,4-di-tert-butyl-p-cresol was added to terminate the polymerization. Subsequently, the solvent was removed by steam stripping, and the rubber was dried by a roll at 110° C. to obtain a polymer before modification. The polymerization results are shown in Table 1.

In addition, the remaining polymer solution was maintained at a temperature of 60° C. and a toluene solution of 3-glycidoxypropyltrimethoxysilane (hereinafter sometimes referred to as GPMOS) (4.5 mmol) was added to continue the reaction for 30 minutes. Then, a toluene solution of tris(2-ethylhexanoate)bismuth (hereinafter sometimes referred to as EHABi) (13.5 mmol) was added and mixed for 30 minutes. Subsequently, a methanol solution containing 1.5 g of 2,4-di-tert-butyl-p-cresol was added to obtain 2.5 kg of a modified polymer solution.

Next, the modified polymer solution was added to 20 L of an aqueous solution adjusted to pH 10 with sodium hydroxide

Example 2

Preparation of Modified Polymer B

A modified polymer was obtained by using the same components and the same polymerization method as in Example 1, except for using tetra-n-propoxy zirconium (hereinafter sometimes referred to as NPOZr) instead of tris(2-ethylhexanoate)bismuth. The modification and condensation conditions and the results of the reaction are shown in Table 1.

Example 3

Preparation of Modified Polymer C

A modified polymer was obtained by using the same components and the same polymerization method as in Example 1, except for using bis(2-ethylhexanoate)zirconium oxide (hereinafter sometimes referred to as EHAZrO) instead of tris(2-ethylhexanoate)bismuth. The modification and condensation conditions and the results of the reaction are shown in Table 1.

Example 4

Preparation of Modified Polymer D

A modified polymer was obtained by using the same components and the same polymerization method as in Example 1, except for using tri-sec-butoxyaluminum (hereinafter sometimes referred to as SBOAl) instead of tris(2-ethylhexanoate)bismuth. The modification and condensation conditions and the results of the reaction are shown in Table 1.

Example 5

Preparation of Modified Polymer E

A modified polymer was obtained by using the same components and the same polymerization method as in Example 1, except for using tris(2-ethylhexanoate)aluminum (hereinafter sometimes referred to as EHAAl) instead of tris(2-ethylhexanoate)bismuth. The modification and condensation conditions and the results of the reaction are shown in Table 1.

Example 6

Preparation of Modified Polymer F

A modified polymer was obtained by using the same components and the same polymerization method as in Example 1, except for using zirconium tetrakis(acetylacetonate) (hereinafter sometimes referred to as ZrAC) instead of tris(2-ethylhexanoate)bismuth. The modification and condensation conditions and the results of the reaction are shown in Table 1.

Example 7

Preparation of Modified Polymer G

A modified polymer was obtained by using the same components and the same polymerization method as in Example 1, except for using aluminum tris(acetylacetonate) (hereinafter sometimes referred to as AlAC) instead of tris(2-ethylhexanoate)bismuth. The modification and condensation conditions and the results of the reaction are shown in Table 1.

Example 8

Preparation of Modified Polymer H

A 5 L autoclave of which the internal atmosphere was replaced by nitrogen was charged with 2.4 kg of cyclohexane and 300 g of 1,3-butadiene. A catalyst, prepared from a cyclohexane solution of neodymium versatate (0.09 mmol), a toluene solution of MAO (1.8 mmol), DIBAH (5.0 mmol), a toluene solution of diethylaluminum chloride (0.18 mmol), and 1,3-butadiene (4.5 mmol) by reacting and aging at 50° C. for 30 minutes, was added to polymerize the monomers at 80° C. for 60 minutes. The reaction conversion rate of 1,3-butadiene was about 100%. The polymer solution of 200 g was extracted and a methanol solution containing 1.5 g of 2,4-di-tert-butyl-p-cresol was added to terminate the polymerization. Subsequently, the solvent was removed by steam stripping, and the rubber was dried by a heat roll at 110° C. to obtain a polymer before modification. The polymerization results are shown in Table 1.

In addition, the remaining polymer solution was maintained at a temperature of 60° C. and a toluene solution of GPMOS (4.5 mmol) was added to continue the reaction for 30 minutes. Then, 3-aminopropyltriethoxysilane (hereinafter sometimes referred to as APEOS) (13.5 mmol) was added and mixed for 30 minutes. A toluene solution of NPOZr (13.5 mmol) was further added and mixed for 30 minutes. Subsequently, a methanol solution containing 1.5 g of 2,4-di-tert-butyl-p-cresol was added to obtain 2.5 kg of a modified polymer solution.

Next, the modified polymer solution was added to 20 L of an aqueous solution adjusted to pH 10 with sodium hydroxide to carry out solvent removal and a condensation reaction at 110° C. for two hours, followed by drying using a roll to obtain a modified polymer. The modification and condensation conditions and the results of the reaction are shown in Table 1.

Example 9

Preparation of Modified Polymer I

A modified polymer was obtained by using the same components and the same polymerization method as in Example 8, except for using a toluene solution of N-(3-triethoxysilylpropyl)-4,5-dihydroimidazole (hereinafter sometimes referred to as EOSDI) instead of the toluene solution of APEOS. The modification and condensation conditions and the results of the reaction are shown in Table 1.

Comparative Example 1

Preparation of Modified Polymer J

A modified polymer was obtained by using the same components and the same polymerization method as in Example 1, except for omitting the addition of EHABi. The modification and condensation conditions and the results of the reaction are shown in Table 1.

Comparative Example 2

Preparation of Modified Polymer K

A modified polymer was obtained by using the same components and the same polymerization method as in Example 1, except for using bis(2-ethylhexanoate)tin (hereinafter sometimes referred to as EHASn) instead of EHABi. The modification and condensation conditions and the results of the reaction are shown in Table 1.

Comparative Example 3

Preparation of Modified Polymer L

A modified polymer was obtained by using the same components and the same polymerization method as in Example 1, except for replacing NPOZr with EHASn. The modification and condensation conditions and the results of the reaction are shown in Table 1.

Comparative Example 4

Polymer M

The results of analysis of a commercially available polybutadiene rubber (polybutadiene rubber BR01™ manufactured by JSR Corp.) are shown in Table 1.

Examples 10 to 18 and Comparative Examples 5 to 8

Using the polymers A to M of Examples 1 to 9 and Comparative Examples 1 to 4, silica-containing rubber compositions (Composition 1) and carbon black-containing rubber compositions (Composition 2) shown in Table 2 were prepared.

The Mooney viscosity of these unvulcanized rubber compositions was measured. In addition, Composition 1 was vulcanized at 150° C. for 12 minutes and Composition 2 was vulcanized at 45° C. for 30 minutes, and the properties of the vulcanized rubbers were evaluated. The results are shown in Table 3.

Based on the results of the silica compositions of Examples 10 to 18, and Comparative Examples 5 to 8, it can be seen that low heat buildup, low temperature properties, and abrasion resistance have been significantly improved by adding EHABi, NPOZr, EHAZrO, SBOAl, EHAAl, ZrAC, and AlAC as condensation accelerators. In addition, based on the results of the carbon black compositions of Examples 17 and 18, and Comparative Examples 7 and 8, it can be seen that low heat buildup, low temperature properties, and abrasion resistance of the carbon black-compounded compositions have been significantly improved by the addition of NPOZr as a condensation accelerator.

TABLE 1

| | | Result of polymerization reaction | | | | Functional | Condensation | Result of modification and condensation reaction | |
|---|---|---|---|---|---|---|---|---|---|
| | | $ML_{1+4}$ (100° C.) | Mw/Mn *1 | cis-1,4 bond content (%) | 1,2-vinyl bond content (%) | Modification agent *2 | group-introducing agent *2 | accelerator *2 | $ML_{1+4}$ (125° C.) | Mw/Mn *1 |
| Example | 1 | 19 | 2.1 | 97.2 | 1.2 | GPMOS (4.5 mmol) | — | EHABI (13.5 mmol) | 68 | 3.0 |
| | 2 | 19 | 2.1 | 97.1 | 1.1 | GPMOS (4.5 mmol) | — | NPOZr (13.5 mmol) | 62 | 2.9 |
| | 3 | 20 | 2.1 | 97.0 | 1.0 | GPMOS (4.5 mmol) | — | EHAZrO (13.5 mmol) | 70 | 3.2 |
| | 4 | 18 | 2.2 | 96.8 | 1.0 | GPMOS (4.5 mmol) | — | SBOAl (13.5 mmol) | 59 | 2.7 |
| | 5 | 17 | 2.3 | 97.1 | 1.1 | GPMOS (4.5 mmol) | — | EHAAl (13.5 mmol) | 66 | 3.1 |
| | 6 | 18 | 2.1 | 96.8 | 1.0 | GPMOS (4.5 mmol) | — | ZrAC (13.5 mmol) | 57 | 2.9 |
| | 7 | 19 | 2.3 | 96.9 | 1.1 | GPMOS (4.5 mmol) | — | AlAC (13.5 mmol) | 62 | 3.2 |
| | 8 | 19 | 2.1 | 97.0 | 1.2 | GPMOS (4.5 mmol) | APEOS (13.5 mmol) | NPOZr (13.5 mmol) | 55 | 3.3 |
| | 9 | 21 | 2.2 | 96.8 | 1.2 | GPMOS (4.5 mmol) | EOSDI (13.5 mmol) | NPOZr (13.5 mmol) | 58 | 3.2 |
| Comparative Example | 1 | 19 | 2.2 | 96.6 | 1.1 | GPMOS (4.5 mmol) | — | — | 55 | 2.8 |
| | 2 | 21 | 2.3 | 96.8 | 1.2 | GPMOS (4.5 mmol) | — | EHASn (13.5 mmol) | 68 | 3.1 |
| | 3 | 22 | 2.2 | 97.0 | 1.2 | GPMOS (4.5 mmol) | APEOS (13.5 mmol) | EHASn (13.5 mmol) | 65 | 3.2 |
| | 3*3 | 45 | 4.0 | 95.0 | 2.5 | — | — | — | — | — |

In Table 1, *1 to *3 are as follows.
*1: Ratio of weight average molecular weight (Mw) to number average molecular weight (Mn)
*2: GPMOS: 3-glycidoxypropyltrimethoxysilane APEOS: 3-aminopropyltriethoxysilane EOSDI: N-(3-triethoxysilylpropyl)-4,5-dihydroimidazole EHABi: tris(2-ethylhexanoate)bismuth NPOZr: dibutyl-tindilauratetetra-n-propoxyzirconium EHAZrO: bis(2-ethylhexanoate)zirconium oxide SBOAl: tri-sec-butoxyaluminum EHAAl: tris(2-ethylhexanoate)aluminum ZrAC: zirconium tetrakis(acetylacetonate) AlAC: aluminum tris(acetylacetonate) EHASn: bis(2-ethylhexanoate)tin
*3Commercially available BR (JSR BR01 ™) manufactured by JSR Corp.

TABLE 2

| Content | Combination 1 | Combination 2 |
|---|---|---|
| Polymer A to M | 70 | 50 |
| Natural rubber | 30 | 50 |
| Silica *1 | 55 | 0 |
| Carbon black *2 | 0 | 50 |
| Aroma oil *3 | 10 | 10 |
| Stearic acid | 2 | 2 |
| Silane coupling agent *4 | 5.5 | 0 |
| aging inhibitor agent *5 | 1 | 1 |
| Zinc oxide | 3 | 3 |
| Vulcanization accelerator DPG *6 | 1 | 0.5 |
| Vulcanization accelerator DM *7 | 1 | 0.5 |
| Vulcanization accelerator NS *8 | 1 | 0.5 |
| Sulfur | 1.5 | 1.5 |

In Table 2, *1 to *8 are as follows.
*1: Nipsil AQ ™ manufactured by Tosoh Silica Corporation (the former Japan Silica Industries Co., Ltd.)
*2: Seast KH ™ manufactured by Tokai Carbon Co., Ltd.
*3: Fukkol Aromax #3 ™ manufactured by Fuji Kosan Co., Ltd.
*4: Si69 ™ manufactured by Degussa Japan Co., Ltd. Compound name: bis(3-triethoxysilylpropyl)tetrasulfide
*5: Nocrac 6C ™ manufactured by Ouchi Shinko Chemical Industrial Co., Ltd. Compound name: N-phenyl-N'-(1,3-dimethylbutyl)-p-phenylenediamine
*6: Nocceler D ™ manufactured by Ouchi Shinko Chemical Industrial Co., Ltd. Compound name: 1,3-diphenyl guanidine
*7: Nocceler DM ™ manufactured by Ouchi Shinko Chemical Industrial Co., Ltd. Compound name: di-2-benzothiazolyl disulfide
*8: Nocceler NS-F ™ manufactured by Ouchi Shinko Chemical Industrial Co., Ltd. Compound name: N-t-butyl-2-benzothiazolylsulfene amide as vibration-proof rubber, fender beams, belts, and hoses. In particular, however, it is preferably used for tire treads.

The invention claimed is:

1. A process for producing a modified polymer comprising a step of carrying out a modification reaction on an active end of a conjugated diene polymer having a vinyl content of less than 10%, a cis-1,4 bond content of 75% or higher, and an active end using an alkoxysilane compound, and a step of carrying out a condensation reaction in the presence of a condensation accelerator comprising a compound of zirconium (Zr), bismuth (Bi), or aluminum (Al).

2. The process according to claim 1, wherein the compound constituting the condensation accelerator is an alkoxide, a carboxylate, or an acetylacetonate complex salt of the above-mentioned element.

3. The process according to claim 1, wherein the alkoxysilane compound comprises at least one functional group selected from the following (a) to (c):
   (a) an epoxy group;
   (b) an isocyanate group; and
   (c) a carboxyl group.

4. The process according to claim 1, wherein the condensation accelerator is at least one compound selected from the following (d) to (h):
   (d) a bismuth carboxylate;
   (e) a zirconium alkoxide;
   (f) a zirconium carboxylate;
   (g) an aluminum alkoxide; and

TABLE 3

| | | | Composition 1 (silica-comtaining rubber composition) | | | | | Composition 2 (carbon black-comtaining rubber composition) | | | |
|---|---|---|---|---|---|---|---|---|---|---|---|
| | | Polymer | Mooney viscosity $ML_{1+4}$ (100° C.) | Tensile strength $T_B$(MPa) | Low heat buildup 3% tan δ *1 | Low temperature −20° C.G' *1 | Abrasion resistance *1 | Mooney viscosity $ML_{1+4}$ 100° C. | Tensile strength $T_B$(MPa) | Low heat buildup 3% tan δ *1 | Abrasion resistance *1 |
| Example | 10 | A | 72 | 20.8 | 131 | 181 | 135 | — | — | — | — |
| | 11 | B | 67 | 21.4 | 132 | 183 | 133 | — | — | — | — |
| | 12 | C | 74 | 21.5 | 134 | 187 | 137 | — | — | — | — |
| | 13 | D | 65 | 20.8 | 133 | 179 | 134 | — | — | — | — |
| | 14 | E | 69 | 20.7 | 131 | 176 | 138 | — | — | — | — |
| | 15 | F | 70 | 21.2 | 128 | 169 | 129 | — | — | — | — |
| | 16 | G | 71 | 21.8 | 127 | 171 | 127 | — | — | — | — |
| | 17 | H | 69 | 22.5 | 138 | 174 | 132 | 94 | 29.2 | 145 | 132 |
| | 18 | I | 68 | 21.9 | 137 | 173 | 134 | 100 | 29.7 | 139 | 133 |
| Comparative | 5 | J | 67 | 20.6 | 109 | 127 | 123 | — | — | — | — |
| Example | 6 | K | 70 | 20.8 | 124 | 160 | 125 | — | — | — | — |
| | 7 | L | 67 | 21.7 | 125 | 149 | 124 | 96 | 28.3 | 131 | 126 |
| | 8 | M | 72 | 17.3 | 100 | 100 | 100 | 81 | 25.5 | 100 | 100 |

In Table 3, *1 is as follows.
*1: Relative values to the value (100) of Comparative Example 8. The larger the values, the better the properties.

INDUSTRIAL APPLICABILITY

According to the present invention, a rubber composition having excellent fracture characteristics, low heat buildup, low temperature characteristics, and abrasion resistance when subjected to vulcanization treatment to form a vulcanized rubber as well as excellent processability can be obtained either when silica or carbon black is added to the obtained modified conjugated diene polymer.

The rubber composition containing a modified conjugated diene polymer obtained in the present invention can be suitably used for tires such as tire treads, under treads, carcasses, side walls, and beads, as well as other industrial products such (h) an aluminum carboxylate.

5. The process according to claim 1, wherein the process further comprises a step of adding a compound containing at least one functional group selected from the following (i) to (k):
   (i) an amino group;
   (j) an imino group; and
   (k) a mercapto group.

6. The process according to claim 1, wherein the conjugated diene compound is at least one compound selected from 1,3-butadiene, isoprene, and 2,3-dimethyl-1,3-butadiene.

7. The process according to claim 1, wherein the conjugated diene polymer having an active end is a polymer obtained by polymerizing a conjugated diene compound using a catalyst containing the following components (l) to (n) as the main components:

(l) a compound containing a rare earth element having an atomic number of 57 to 71 in the periodic table or a reaction product of the compound with a Lewis base;

(m) an alumoxane and/or an organoaluminum compound of the formula $AlR^1R^2R^3$ (wherein $R^1$ and $R^2$, which may be the same or different, are hydrocarbon groups having 1 to 10 carbon atoms or are hydrogen atoms, and $R^3$ is a hydrocarbon group having 1 to 10 carbon atoms and may be the same as or different from $R^1$ or $R^2$); and (n) a halogen-containing compound.

8. A modified polymer produced by carrying out a modification reaction on an active end of a conjugated diene polymer having a vinyl content of less than 10%, a cis-1,4 bond content of 75% or higher, and an active end using an alkoxysilane compound, and a step of carrying out a condensation reaction in the presence of a condensation accelerator comprising a compound of zirconium (Zr), bismuth (Bi), or aluminum (Al).

9. A rubber composition comprising the modified polymer according to claim 8.

10. A rubber composition comprising a rubber component including at least 20% by mass of the modified polymer according to claim 8 and silica and/or carbon black in an amount of 20 to 120 parts by mass per 100 parts by mass of the rubber component.

11. The rubber composition according to claim 9, wherein the rubber component comprises 20 to 100% by mass of the modified polymer and 80 to 0% by mass of at least one other rubber selected from the group consisting of a natural rubber, a synthetic isoprene rubber, a butadiene rubber, a styrene-butadiene rubber, an ethylene/α-olefin copolymer rubber, an ethylene/α-olefin-diene copolymer rubber, an acrylonitrile/butadiene copolymer rubber, a chloroprene rubber, and a halogenated butyl rubber (with proviso that amount of modified polymer+amount of other rubber(s)=100% by mass).

12. The process according to claim 1, wherein the condensation reaction is carried out in the presence of a compound of zirconium.

13. The process according to claim 1, wherein the condensation reaction is carried out in the presence of a compound of bismuth.

14. The process according to claim 1, wherein the condensation reaction is carried out in the presence of a compound of aluminum.

* * * * *